United States Patent [19]
Carrara

[11] Patent Number: 5,910,204
[45] Date of Patent: Jun. 8, 1999

[54] METHOD FOR THE PRODUCTION OF PACKING FOR STUFFING BOXES

[76] Inventor: Sergio Carrara, Via Vecchi, 7 - 24060 Adrara S. Martino, Bergamo, Italy

[21] Appl. No.: 08/913,676

[22] PCT Filed: Mar. 12, 1996

[86] PCT No.: PCT/EP96/01045

§ 371 Date: Sep. 18, 1997

§ 102(e) Date: Sep. 18, 1997

[87] PCT Pub. No.: WO96/29455

PCT Pub. Date: Sep. 26, 1996

[30] Foreign Application Priority Data

Mar. 20, 1995 [IT] Italy .............................. MI95A0544 U

[51] Int. Cl.$^6$ ..................................................... D04C 3/48
[52] U.S. Cl. .............................. 87/31; 87/8; 87/13; 87/14; 87/50
[58] Field of Search .............................. 87/5, 6, 8, 9, 13, 87/14, 28, 29, 31, 42, 44, 50

[56] References Cited

U.S. PATENT DOCUMENTS

| | | | |
|---|---|---|---|
| 1,927,477 | 9/1933 | Walton | 87/5 |
| 2,048,886 | 7/1936 | Olson | 87/6 |
| 2,716,304 | 8/1955 | Main | 87/6 |
| 3,124,032 | 3/1964 | Webster et al. | 87/6 |
| 3,129,631 | 4/1964 | Hill et al. | 87/6 |
| 4,333,380 | 6/1982 | Kozlowski | 87/29 |
| 4,802,398 | 2/1989 | Champlin et al. | 87/8 |
| 5,417,138 | 5/1995 | Morris | 87/31 |

FOREIGN PATENT DOCUMENTS

| | | | |
|---|---|---|---|
| 2025475 | 1/1980 | United Kingdom | 87/6 |
| 94/11555 | 5/1994 | WIPO . | |

*Primary Examiner*—William Stryjewski
*Attorney, Agent, or Firm*—Sheridan Ross P.C.

[57] ABSTRACT

A method for producing packing for the stuffing of boxes, among other purposes. In one embodiment, the packing enables compressive forces to be transmitted uniformly from a gland along an entire winding of the packing so as to eliminate stresses within the packing itself. The method includes a step in which elementary yarns converge to form the packing at an assembly point and a step in which the packing is wound into a coil starting at the assembly point.

6 Claims, 4 Drawing Sheets

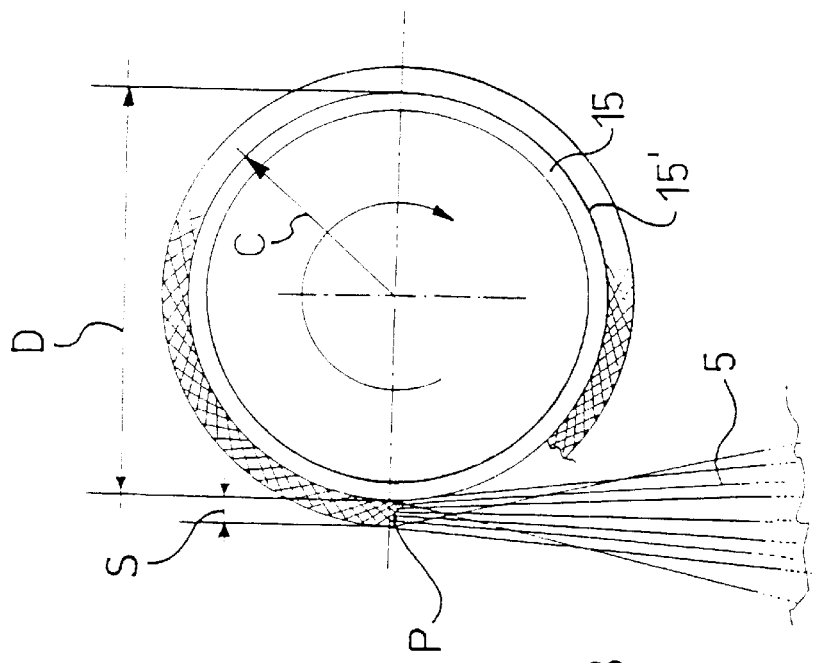
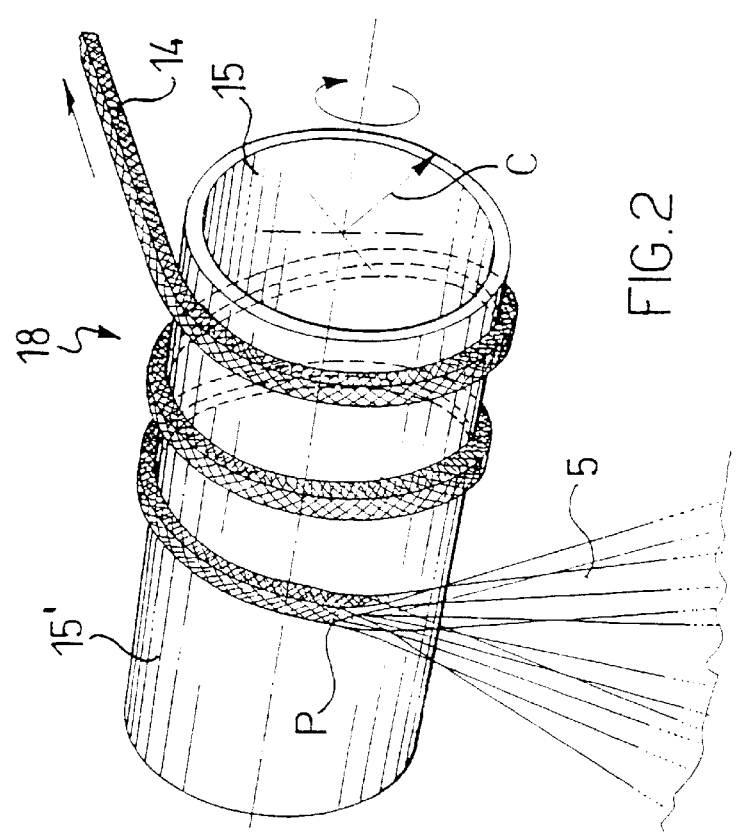

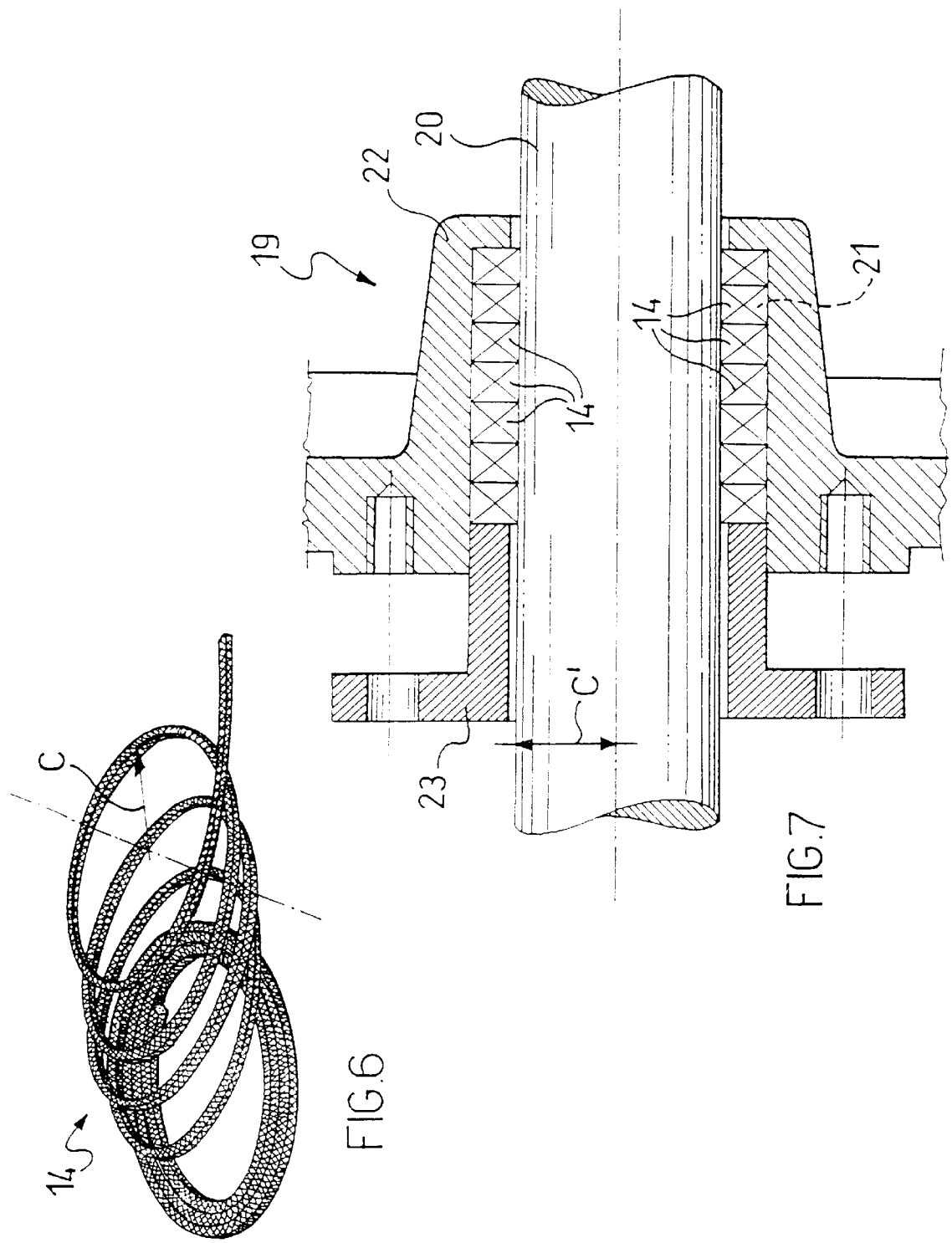

METHOD FOR THE PRODUCTION OF PACKING FOR STUFFING BOXES

FIELD OF THE INVENTION

The present invention relates to a method for the production of packing for stuffing boxes, including a step in which the elementary yarns are braided to form the packing at an assembly point.

BACKGROUND INFORMATION

It is known that packings produced by the method specified above are wound around pump shafts or valve rods within a stuffing box to reduce or eliminate liquid losses. The packing thus arranged is compressed by a gland with a predetermined force so that it presses against the surface of the shaft or rod.

As a result of the curvature imposed by the winding, the elementary yarns on the extrados surface of the packing are in traction while the elementary yarns on the intrados surface are compressed so that the cross-section of the packing, which initially is square or rectangular, deforms into an isosceles trapezium with its larger base on the intrados side.

As a result of this deformation, the compressive force is not transmitted uniformly through the packing. Thus it is necessary to increase the force to achieve adequate hydraulic sealing at the expense of greater wear of the packing itself due to yielding and friction.

WO-A-94/11555 discloses a packing which has a cross-section in the form of an isosceles trapezium with its larger base on the extrados side. The deformation induced by the winding makes the section square or rectangular, improving the uniformity of transmission of the compressive forces.

The elementary yarns in such a packing are however subject to yielding as in conventional packing and are, in any case, under traction and compression. Moreover, in pumps, the friction is increased since the elementary yarns on the intrados surface are pressed together by the overlying yarns and pressed onto the surface of the shaft with a consequent loss of energy and overheating of the packing.

SUMMARY OF THE INVENTION

The technical problem which is at the root of the present invention is to provide a method for the production of packing for stuffing boxes, which packing is able to avoid the problems mentioned with reference to the prior art.

This problem is solved by a method of the type specified which is characterised in that it includes a step of winding the packing starting at the assembly point.

The main advantage of the method of the invention lies in the fact that packing is obtained which enables compressive forces to be transmitted uniformly through adjacent turns while at the same time eliminating forces within the packing.

BRIEF DESCRIPTION OF THE DRAWINGS

Further characteristics and advantages will become clear from the description of one preferred embodiment of the method of the invention, given below by way of non-limitative example, with reference to a machine for carrying out the said method and packing formed as illustrated in the appended drawings, in which:

FIG. 2 is a perspective view of a detail of the machine of FIG. 1;

FIG. 3 is a cross-section of the detail of FIG. 2;

FIG. 6 is a perspective view of a portion of the packing of FIG. 5 in a rest condition; and FIG. 7 is a sectional view of the packing of FIG. 5 within a stuffing box.

DETAILED DESCRIPTION

Figure 1:
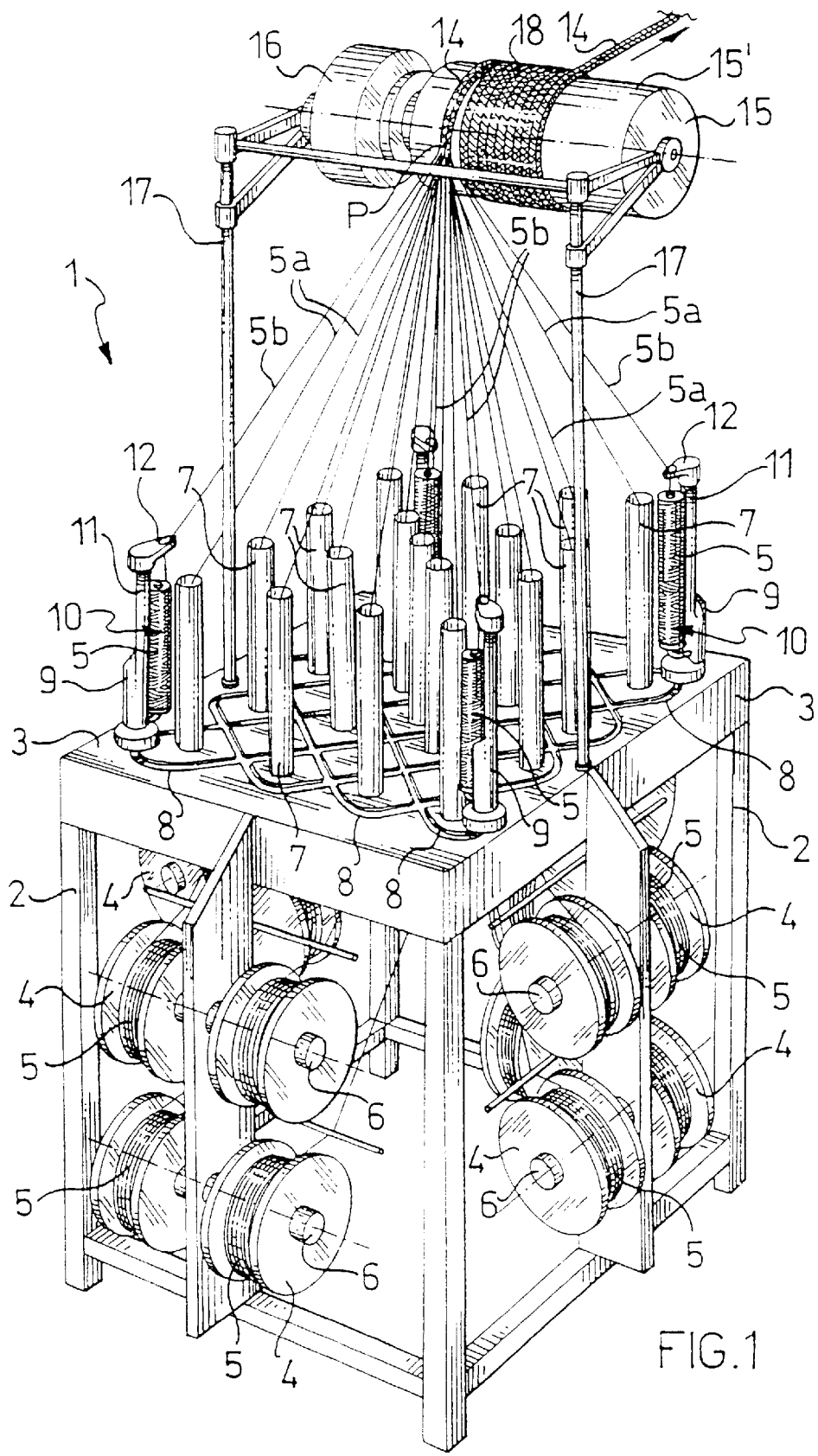
FIG. 1 is a schematic perspective view of a machine for carrying out the method for the production of packing for stuffing boxes according to the invention.
Figure 4:
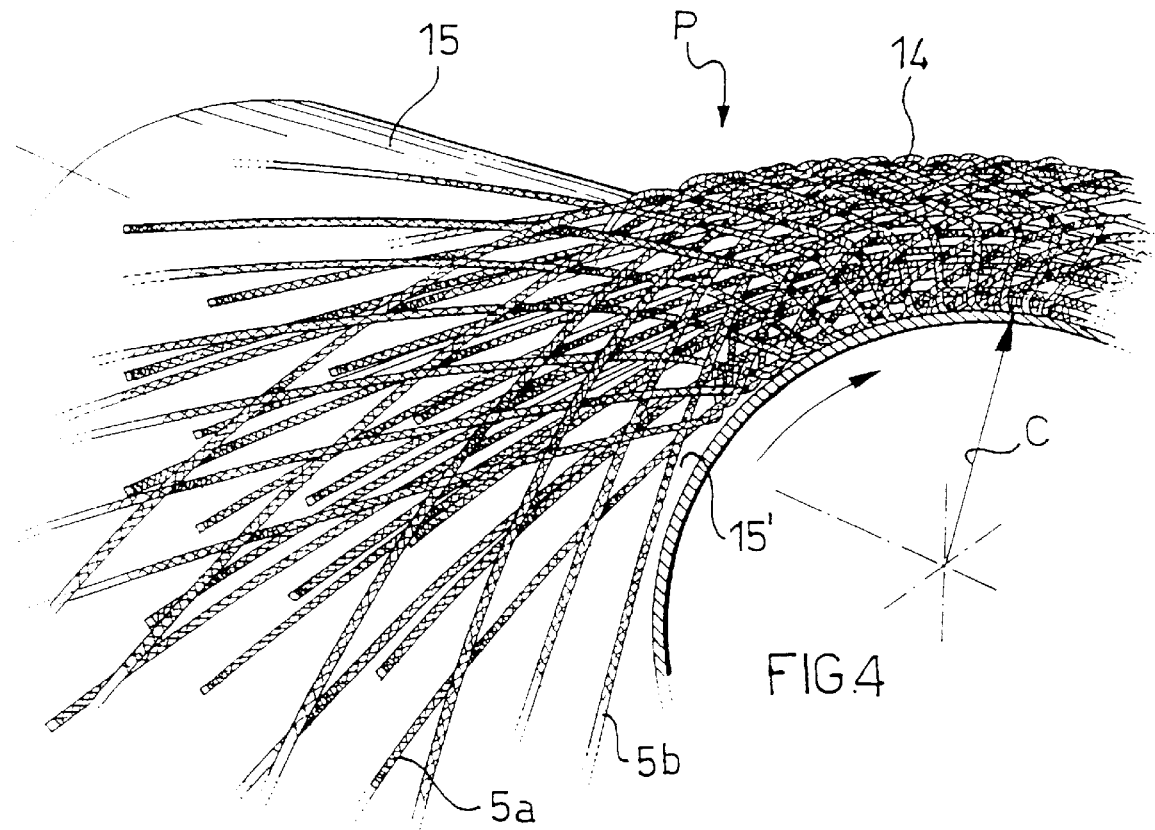
FIG. 4 is a close-up perspective view of the step in which packing is braided in the machine of FIG. 1.
Figure 5:
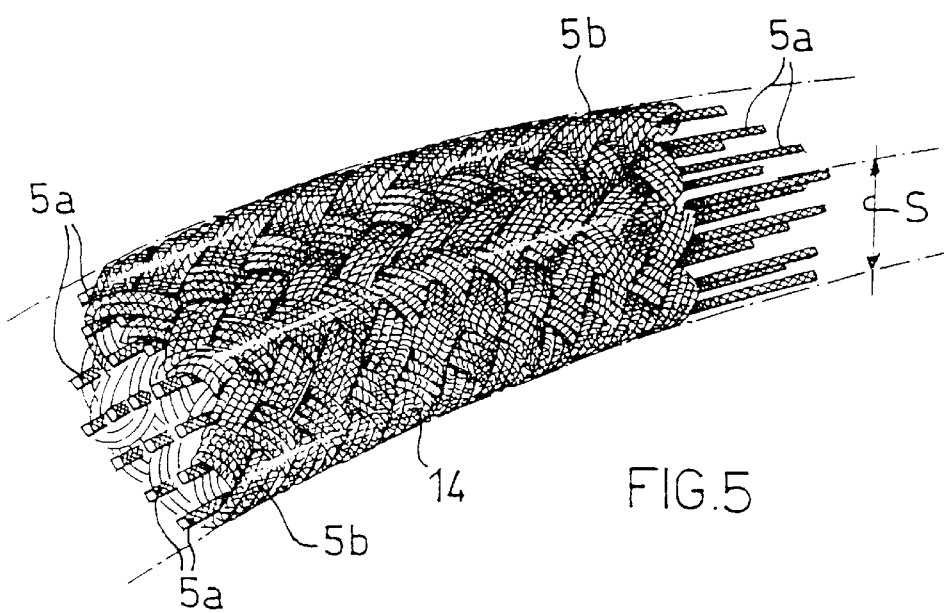
FIG. 5 is an enlarged perspective view of packing formed by the method for the production of packing for stuffing boxes according to the invention.

With reference to FIG. 1, a machine for the production of packing for stuffing boxes by means of the method for the production of packing for stuffing boxes according to the invention is indicated 1.

The machine 1 includes a frame 2, a horizontal thread guide plate 3 supported by the frame 2, a plurality of reels 4 of elementary yarns 5 rotatably engaged on respective fixed pins 6 of the frame 2 beneath the thread guide plate 3.

The thread guide plate 3 has a plurality of thread guide tubes 7 corresponding to the plurality of reels 4, the thread guide tubes extending perpendicular to the plate 3 and passing therethrough. In this embodiment there are seventeen thread guide tubes 7 arranged in a square with four tubes per side plus a tube in the central position.

The elementary yarn 5 of each reel 4 passes through the respective tube 7 and is termed conventionally a core yarn. Above the thread guide plate 3, each core yarn is maintained at a predetermined position relative to the other core yarns and is indicated 5a.

The thread guide plate 3 has a plurality of diagonal paths 8 located in its upper surface and arranged so as to surround each of the thread guide tubes 7.

The machine 1 further includes a plurality of movable elements 9 which are driven to move along the diagonal paths 8 by drive means housed within the thread guide plate 3 but not shown since they are conventional, there being a corresponding plurality of spools 10 of elementary yarns 5 rotatably engaged on the movable elements 9, each of which has a vertical rod 11 with a ring 12 at its upper end at a height above that of the ends of the thread guide tubes 7.

FIG. 1 shows only one movable element 9 for each diagonal path 8 when, in reality, the machine 1 includes several, for example four, movable elements 9 for each diagonal path 8.

The movement of the movable elements 9 is arranged so that they travel at the same speed, at a constant distance apart on each path 8 so that the movable elements 9 never touch each other.

The elementary yarn 5 of each spool 10 passes through the respective ring 12 and is conventionally termed a strand. Above the thread guide plate 3, the strands are braided with the core yarns 5a and are indicated 5b.

All the core yarns 5a and the strands 5b coming from the reels 4 and spools 10 respectively converge to an assembly point P above the centre of the thread guide plate 3 where they are braided to form a packing 14.

The assembly point P is located on the surface 15' of a horizontal roll 15 of the machine 1, the roll having a diameter D and being rotated by a motor 16. The roll 15 and the motor 16 are supported by a pair of uprights 17.

As a result of the rotation of the roll 15, the packing 14 forms a coil 18 on the surface 15' from which it is drawn by a draw and packaging assembly not shown since it is conventional.

The method of the invention includes a braiding step in which the elementary yarns 5 are braided to form the packing 14 at the assembly point P and a winding step in which the packing 14 is wound starting from the assembly point P into a coil.

In the machine 1 described above, the braiding step is effected, in an entirely conventional manner, by the movement of the movable elements 9 which causes the strands 5*b* to interlace with the core yarns 5*a* coming from the reels 4 and by the simultaneous traction exerted by the forced rotation of the roll 15 both on the strands 5*b* and on the core yarns 5*a* which unwind respectively from the spools 10 and the reels 4 which are free to rotate in their seats.

All the elementary yarns 5, namely both the core yarns 5*a* and the strands 5*b*, meet at the assembly point P to form the packing 14.

The winding step occurs at a winding diameter D as a result of the location of the assembly point P on the surface 15' of the rotary roll 15.

As a result of this rotation, those core yarns 5*a* and strands 5*b* which, at the assembly point, are further from the surface 15' of the roll 15, or on the extrados surface of the packing 14, are drawn at a higher velocity than the core yarns 5*a* and strands 5*b* which are close to the surface 15', or on the intrados surface of the packing 14, since they follow the same curved path but with a larger radius of curvature in a given unit of time.

The result is that, in its rest condition, the packing 14 produced by the method described above, has a square cross-section and is curved (FIG. 6) with a radius of curvature C which substantially corresponds to the predetermined winding diameter D.

FIG. 7 shows a stuffing box 19 of a pump, not all of which is shown, and which has a drive shaft 20 of radius C'. Packing 14 produced by the method described above is wound around the drive shaft 20 within a chamber 21 defined by a bush 22 and compressed by a gland 23.

The radius of curvature C of the packing 14 must approximate the radius C' of the shaft 20. There is a direct correlation between this latter magnitude and the thickness S of the packing 14 such that, in accordance with normal practice, it is possible, for a particular thickness S of packing, to determine the correct value of the diameter D of the cylinder 15 on which the assembly point P should be located in the machine 1.

What has been stated above is also true for a stuffing box for a valve rod.

In addition to the aforesaid advantage, the method for the production of the packing for stuffing boxes is quick and economic to carry out by conventional equipment.

Moreover, it lends itself to the production of packing of different dimensions, the winding diameter simply being changed by means of the replacement of the roll, while the cross-section need not necessarily be right-angled but may also be circular.

Furthermore, the packing produced by the said method has greater resistance to wear and can rapidly be put into use.

In the case of a pump stuffing box, the quantity of liquid which acts as a lubricant and coolant which passes between the intrados surface of the packing and the surface of the pump shaft is reduced, this quantity however being essential to avoid burning of the packing due to friction and hastened wear.

An expert in the art may make numerous variations in the method for the production of packing for stuffing boxes described above, to the machine for carrying out the method and to the packing thus formed to satisfy various specific requirements, all of which however fall within the scope of protection of the invention as defined by the following claims.

I claim:

1. A method for the production of braided packing for stuffing boxes including a step in which elementary yarns (5) are braided at an assembly point (P) to form a packing (14), characterised in that it includes a step of winding the packing (14) into a coil starting at the assembly point (P).

2. A method according to claim 1, wherein the step of winding the packing (14) occurs at a predetermined winding diameter (D).

3. A braided packing (14) produced by the method according to claim 1 or 2 characterised in that, in its rest condition, it is curved.

4. A stuffing box (19) comprising at least one length of braided packing (14) produced by the method according to claim 1 or 2 characterised in that, in the rest condition, the at least one length of braided packing (14) is curved.

5. A machine (1) for the manufacture of braided packing for stuffing boxes including a plurality of reels (4) of elementary yarns (5*a*) rotatably engaged on respective fixed pins (6) and a plurality of spools (10) of elementary yarns (5*b*) rotatably engaged on respective movable elements (9), the elementary yarns (5*a*, 5*b*) of the reels (4) and the spools (10) converging to an assembly point (P) so as to form a packing (14), characterised in that the assembly point (P) is located on the surface (15') of a roll (15) of the machine (1) which is rotated.

6. A machine (1) according to claim 5, wherein the roll (15) has a predetermined diameter (D).

* * * * *